US011385900B2

(12) United States Patent
Tan

(10) Patent No.: US 11,385,900 B2
(45) Date of Patent: Jul. 12, 2022

(54) ACCESSING QUEUE DATA

(71) Applicant: Hangzhou DPtech Technologies Co., Ltd., Zhejiang Province (CN)

(72) Inventor: Tian Tan, Hangzhou (CN)

(73) Assignee: Hangzhou DPtech Technologies Co., Ltd., Zhejiang Province (CN)

( * ) Notice: Subject to any disclaimer, the term of this patent is extended or adjusted under 35 U.S.C. 154(b) by 396 days.

(21) Appl. No.: 16/669,701

(22) Filed: Oct. 31, 2019

(65) Prior Publication Data
US 2020/0133855 A1 Apr. 30, 2020

(30) Foreign Application Priority Data
Oct. 31, 2018 (CN) .......................... 201811288069.3

(51) Int. Cl.
*G06F 16/901* (2019.01)
*G06F 9/38* (2018.01)
*G06F 3/06* (2006.01)

(52) U.S. Cl.
CPC ........ *G06F 9/3855* (2013.01); *G06F 16/9027* (2019.01); *G06F 3/0659* (2013.01); *G06F 2205/064* (2013.01)

(58) Field of Classification Search
CPC .......... G06F 16/9027; G06F 2205/064; G06F 9/3855; G06F 3/0659
USPC ................................................. 707/797, 799
See application file for complete search history.

(56) References Cited

U.S. PATENT DOCUMENTS

| 5,185,861 | A | * | 2/1993 | Valencia | G06F 12/0842 |
| | | | | | 711/E12.039 |
| 5,261,053 | A | * | 11/1993 | Valencia | G06F 9/5033 |
| | | | | | 711/E12.039 |
| 6,822,958 | B1 | * | 11/2004 | Branth | H04L 49/108 |
| | | | | | 370/395.31 |
| 7,075,928 | B1 | * | 7/2006 | Branth | H04L 12/5601 |
| | | | | | 370/390 |
| 8,806,168 | B2 | * | 8/2014 | Ostrovsky | G06F 12/02 |
| | | | | | 711/170 |

(Continued)

FOREIGN PATENT DOCUMENTS

| CN | 1556475 A | 12/2004 |
| CN | 1570883 A | 1/2005 |

(Continued)

OTHER PUBLICATIONS

State Intellectual Property Office of the People's Republic of China, Office Action and Search Report Issued in Application No. 2018112880693, dated Feb. 19, 2021, 14 pages.

(Continued)

*Primary Examiner* — Phong H Nguyen
(74) *Attorney, Agent, or Firm* — Greenblum & Bernstein, P.L.C.

(57) ABSTRACT

A method and apparatus of accessing queue data is provided. According to the method, a double-layer circular queue is constructed, where the double-layer circular queue includes one or more inner-layer circular queues established based on an array, and the one or more inner-layer circular queues constitute an outer-layer circular queue of the double-layer circular queue based on a linked list. A management pointer of the outer-layer circular queue is set. Data accessing is performed on the inner-layer circular queues by using the management pointer.

12 Claims, 9 Drawing Sheets

(56) References Cited

U.S. PATENT DOCUMENTS

| | | | |
|---|---|---|---|
| 10,031,676 B2* | 7/2018 | Lee | G06F 3/0659 |
| 2010/0265954 A1 | 10/2010 | Pullen et al. | |
| 2013/0067160 A1* | 3/2013 | Ostrovsky | G06F 9/544 |
| | | | 711/E12.019 |
| 2014/0181822 A1* | 6/2014 | Beckmann | G06F 9/544 |
| | | | 718/102 |
| 2017/0351438 A1* | 12/2017 | Lee | G06F 12/0246 |

FOREIGN PATENT DOCUMENTS

| | | |
|---|---|---|
| CN | 101938583 A | 1/2011 |
| CN | 104035884 A | 9/2014 |
| CN | 104050091 A | 9/2014 |
| CN | 104077113 A | 10/2014 |
| CN | 104158625 A | 11/2014 |
| CN | 104657108 A | 5/2015 |
| CN | 107643986 A | 1/2018 |

OTHER PUBLICATIONS

State Intellectual Property Office of the People's Republic of China, Office Action and Search Report Issued in Application No. 2018112880693, dated Jul. 3, 2020 (Submitted with Machine Translation).

* cited by examiner

ACCESSING QUEUE DATA

CROSS REFERENCE TO RELATED APPLICATION

This application claims priority to Chinese Patent Application No. 201811288069.3 entitled "METHOD AND APPARATUS FOR ACCESSING QUEUE DATA" filed on Oct. 31, 2018, the entire content of which is incorporated herein by reference.

TECHNICAL FIELD

The present disclosure relates to the field of data processing technology and in particular to accessing queue data.

BACKGROUND

A queue is a commonly-used data structure for memory, and has the feature of data First in First Out. A circular queue is a queue for space recycling, with its head and tail being connected logically. This circular queue is based on an array or a linked list.

For the circular queue based on an array, the reallocation of a memory space is necessary when the queue is full. Then, data in the queue needs to be copied from its original storage location into a location in a newly-allocated memory. If the memory space allocated each time is very large, the utilizing efficiency of the memory is low.

Meanwhile, if the memory space allocated each time is very small, the number of times of the memory space allocation and data copy are excessively large. This results in a low access performance. For the circular queue based on a linked list, since each node in the circular queue needs to correspond to a pointer, memory space allocation along with the establishment of every node easily produces too many memory fragments, resulting in a low memory utilization rate.

Therefore, the traditional solution for accessing queue data has defects such as a low memory utilization rate and a low access efficiency in some complex scenarios.

SUMMARY

The present disclosure provides a method of accessing queue data and an apparatus for accessing queue data.

According to a first aspect of an example of the present disclosure, there is provided a method of accessing queue data, including:
constructing a double-layer circular queue, where the double-layer circular queue includes one or more inner-layer circular queues established in an array manner, and the one or more inner-layer circular queues constitute an outer-layer circular queue of the double-layer circular queue in a linked list manner;
setting a management pointer for the outer-layer circular queue; and
performing data accessing on the inner-layer circular queues based on the management pointer.

According to a second aspect of an example of the present disclosure, there is provided an apparatus for accessing queue data, including:
a constructing module, configured to construct a double-layer circular queue, where the double-layer circular queue includes one or more inner-layer circular queues established in an array manner, and the one or more inner-layer circular queues constitute an outer-layer circular queue of the double-layer circular queue in a linked list manner;
a setting module, configured to set a management pointer for the outer-layer circular queue; and
an accessing module, configured to perform data accessing on the inner-layer circular queue based on the management pointer.

According to a third aspect of an example of the present disclosure, there is provided an apparatus for accessing queue data, including a non-volatile storage medium, a processor and machine executable instructions stored on the non-volatile storage medium and executed by the processor. When the machine executable instructions are read and executed, the processor is caused to:
construct a double-layer circular queue, where the double-layer circular queue includes one or more inner-layer circular queues established based on an array, and the one or more inner-layer circular queues constitute an outer-layer circular queue of the double-layer circular queue in a linked list manner:
set a management pointer for the outer-layer circular queue; and
perform data accessing on the inner-layer circular queue based on the management pointer.

The technical solutions according to the examples of the present disclosure have the following beneficial effects.

In some examples of the present disclosure, the double-layer circular queue with inner and outer layers being circular queues is established, the management pointer of the outer layer circular queue is set and data accessing is performed on the inner-layer circular queues based on the management pointer. In some complex scenarios, this solution can effectively improve the memory utilization rate and the data access efficiency by fully utilizing the advantages of two queue manners which are respectively based on an array and a linked list.

It is to be understood that the above general descriptions and subsequent detailed descriptions are merely illustrative and explanatory and shall not be intended to be limiting of the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Figure 1:
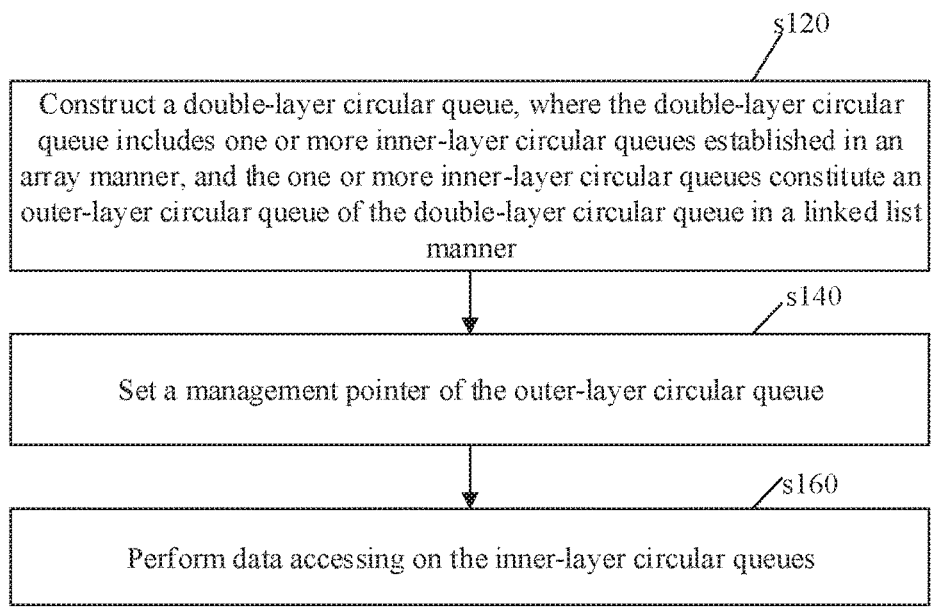
FIG. 1 is a flowchart illustrating a method of accessing queue data according to an example of the present disclosure.

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are merely examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", "said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

Next, detailed description will be made to the examples of the present disclosure.

FIG. 1 is a flowchart illustrating a method of accessing queue data according to an example of the present disclosure. The method includes the following blocks.

At block s120, a double-layer circular queue is constructed, where the double-layer circular queue includes one or more inner-layer circular queues established in an array manner, and the one or more inner-layer circular queues constitute an outer-layer circular queue of the double-layer circular queue in a linked list manner.

Figure 2:
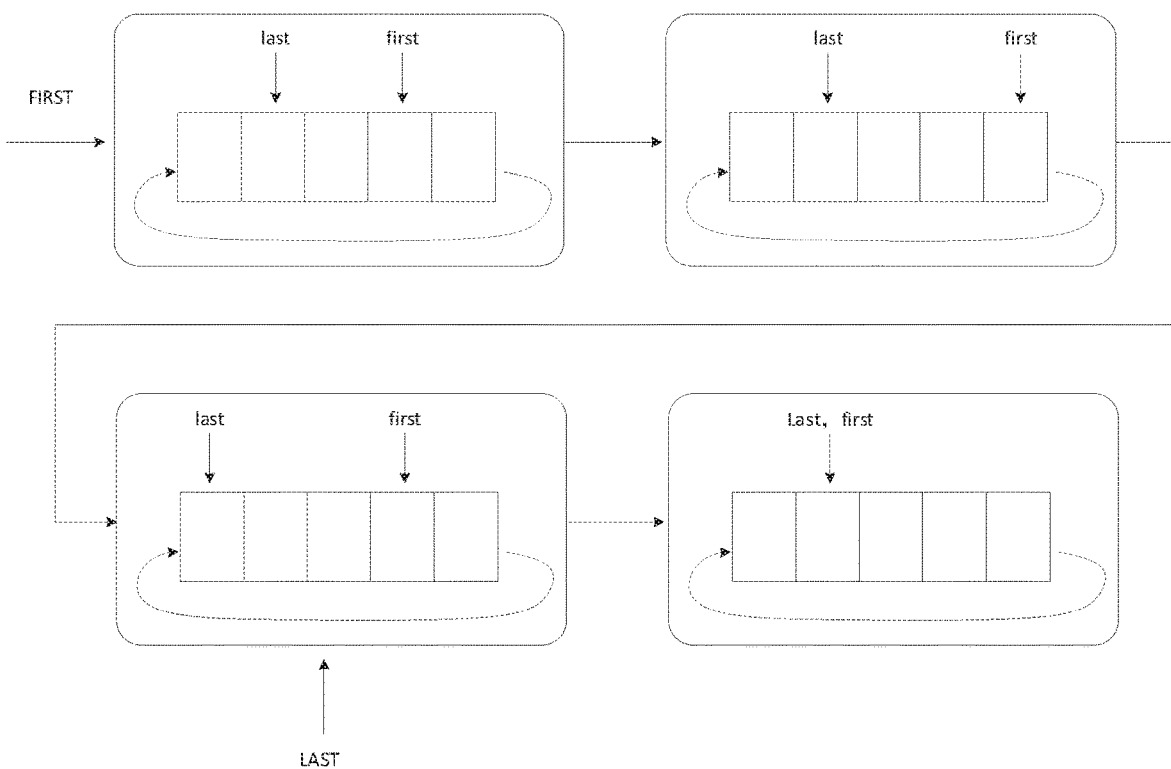
FIG. 2 is a schematic diagram illustrating a basic structure of a double-layer circular queue according to an example of the present disclosure.

At the above block, a double-layer circular queue with an access performance and a space utilization rate reaching a good balance is achieved based on the characteristics of the array implementation manner and the linked list implementation manner of the circular queues. FIG. 2 is a schematic diagram illustrating a basic structure of a double-layer circular queue according to an example of the present disclosure. As shown in FIG. 2, it can be seen that inner and outer layers are both circular queues, where the inner-layer circular queues are implemented based on an array and the outer-layer circular queue is implemented based on a linked list.

In an example, a method of constructing a double-layer circular queue with inner and outer layers being circular queues may include the followings.

(1) One or more inner-layer circular queues are established based on an array, and a memory block with a continuous address space is allocated to each inner-layer circular queue, where the memory block is allocated in a page alignment manner and has a preset size.

Further, a large block of continuous memory may be allocated to each inner-layer circular queue. The memory block requires page alignment to reduce generation of memory fragments. In an actual application, the size of the memory block is usually set to one or two memory pages. If each element occupies a large memory space, the size of the memory block may be increased properly. Herein, sizes of memory blocks corresponding to different inner-layer circular queues may be same or different.

(2) An outer-layer circular queue is obtained by series-connecting each inner-layer circular queue as a node based on a linked list.

Specifically, an outer-layer circular queue is formed by series-connecting each inner-layer circular queue based on a linked list. Each node in the outer-layer circular queue corresponds to an inner-layer circular queue.

At block s140, a management pointer of the outer-layer circular queue is set.

At this block, the outer-layer circular queue is implemented based on a linked list, and the inner-layer circular queues serve as each node of the outer-layer circular queue. Thus, it is required to set a management pointer for the outer-layer circular queue to perform management for the inner-layer circular queues.

In an example, return back to FIG. 2, when the management pointer of the outer-layer circular queue is set, a FIRST pointer and a LAST pointer may be set for the outer-layer circular queue. The FIRST pointer points to the first node of the outer-layer circular queue, where an inner-layer circular queue corresponding to the node is non-empty (that is, at least one element exists in the queue). The LAST pointer points to the last node of the outer-layer circular queue, where an inner-layer circular queue corresponding to the node is non-empty. The pointer pair of the inner-layer circular queue includes a first pointer and a last pointer.

At block s160, data accessing is performed on the inner-layer circular queues based on the management pointer.

At this block, data accessing may be performed on the inner-layer circular queues based on the double-layer circular queue and the management pointer of the outer-layer circular queue, so that a good balance of the accessing performance and the memory space utilization rate is achieved.

In an example, the block of performing data accessing on the inner-layer circular queues based on the management pointer may include the followings.

(1) Queue Initialization

Initialization is performed for the double-layer circular queue. In an initial state, it is required to perform initialization for the double-layer circular queue before data storage is performed.

In an example, the block of performing initialization for the double-layer circular queue may include: establishing an inner-layer circular queue of the double-layer circular queue according to a set memory block value, and pointing both the FIRST pointer and the LAST pointer of the outer-layer circular queue to the inner-layer circular queue.

Specifically, when the double-layer circular queue is initialized, an inner-layer circular queue is firstly established according to a set memory block size, and then the FIRST pointer and the LAST pointer of the double-layer circular queue are pointed to the established inner-layer circular queue to reach an initial use state.

(2) Data in-Queue

Data is stored in a memory block corresponding to the inner-layer circular queue according to a space state of the inner-layer circular queue of a node pointed by the management pointer.

Specifically, data is stored in the memory block of the inner-layer circular queue corresponding to the node according to a use state of the memory space of the inner-layer circular queue of the node pointed by the LAST pointer.

Figure 3:
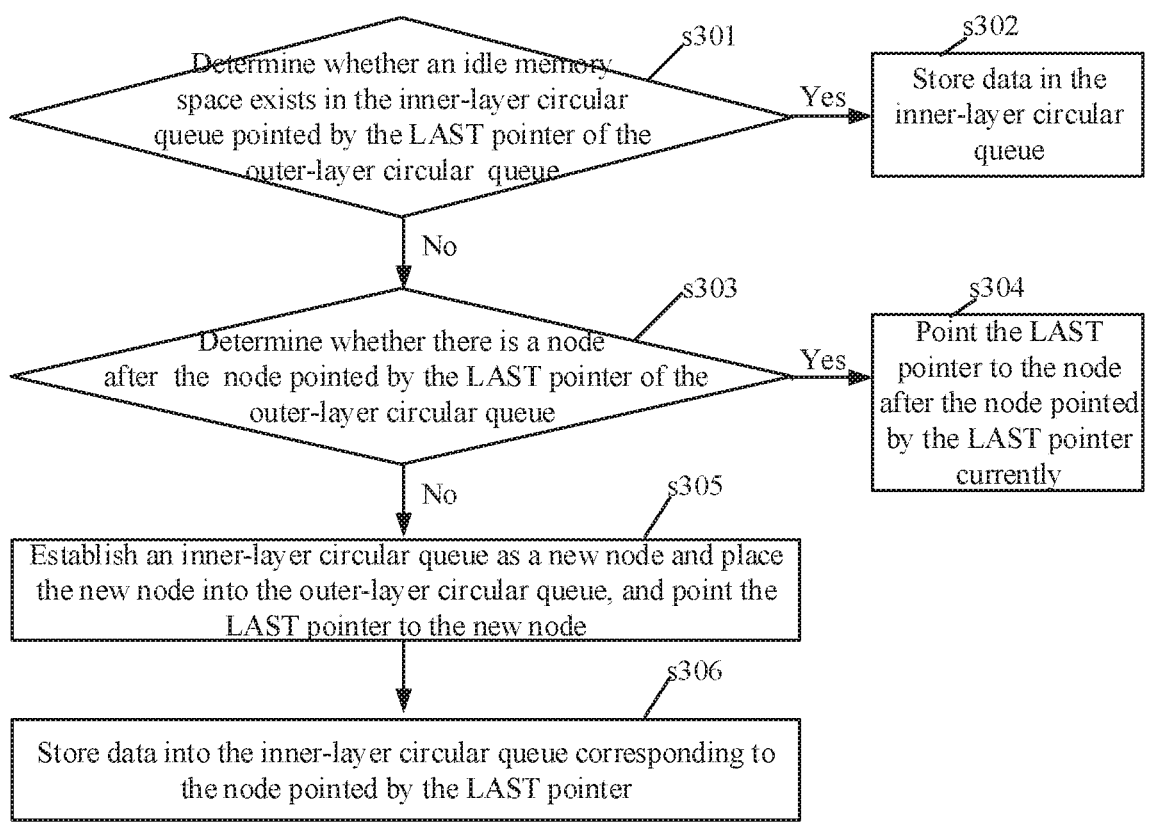
FIG. 3 is a flowchart of data in-queue according to an example of the present disclosure.

In an example, as shown in FIG. 3, the data in-queue may include the following process.

At block s301, it is determined whether an idle memory space exists in the inner-layer circular queue pointed by the LAST pointer of the outer-layer circular queue.

At block s302, if the idle memory space exists, data is stored in the inner-layer circular queue.

At block s303, if no idle memory space exists, it is determined whether there is a node after the node pointed by the LAST pointer of the outer-layer circular queue.

At block s304, if there is a node, the LAST pointer of the outer-layer circular queue is pointed to the node after the node pointed by the LAST pointer currently.

At block s305, if there is no node, an inner-layer circular queue is established as a new node, the new node is added into the outer-layer circular queue, and the LAST pointer of the outer-layer circular queue is pointed to the new node.

At block s306, data is stored into the inner-layer circular queue corresponding to the node pointed by the LAST pointer of the outer-layer circular queue.

In the above example, if it is determined that an idle memory space exists at block s301, data is stored into the inner-layer circular queue. Then, the data storage is completed. If it is determined that no idle memory space exists at block s301, block s303 is further performed.

(3) Data Out-Queue

Data is read from the memory block corresponding to the inner-layer circular queue according to the space state of the inner-layer circular queue of the node pointed by the management pointer.

Specifically, data is read from the memory block of the inner-layer circular queue according to the data storage states of the inner-layer circular queues corresponding to the nodes pointed by the FIRST pointer and the LAST pointer.

Figure 4:
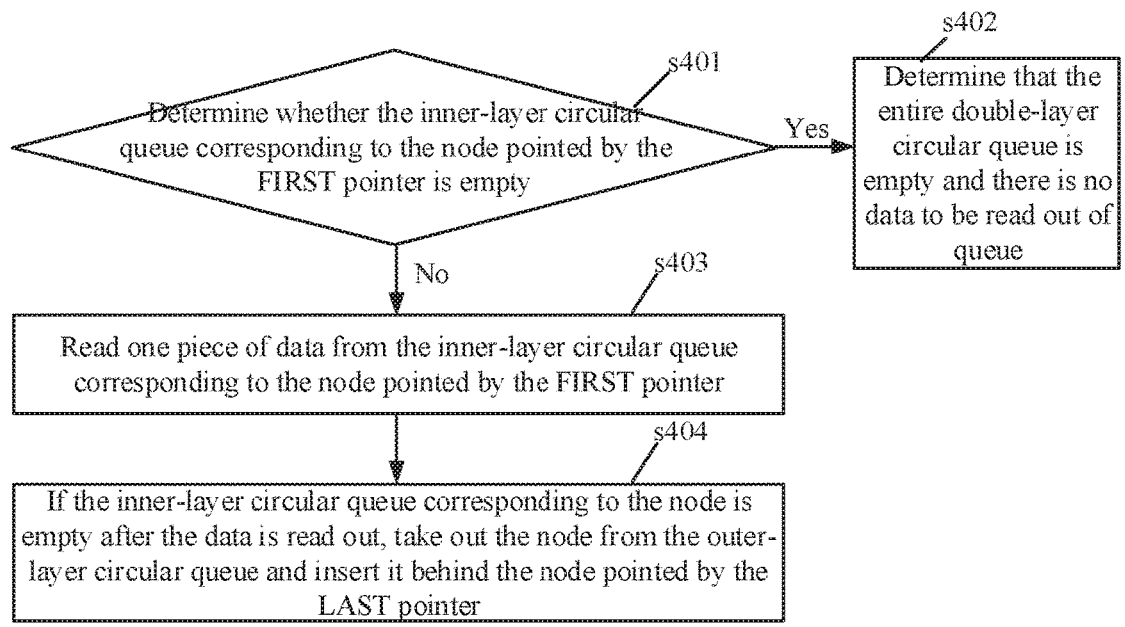
FIG. 4 is a flowchart illustrating data out-queue according to an example of the present disclosure.

In an example, as shown in FIG. 4, the data out-queue may include the following process.

At step s401, it is determined whether the inner-layer circular queue corresponding to the node pointed by the FIRST pointer of the outer-layer circular queue is empty.

At block s402, if the inner-layer circular queue is empty, it is determined that the entire double-layer circular queue is empty and there is no data to be read out of queue.

At block s403, if the inner-layer circular queue is non-empty, data is read out from the inner-layer circular queue corresponding to the node pointed by the FIRST pointer of the outer-layer circular queue.

At block s404, if the inner-layer circular queue corresponding to the node pointed by the FIRST pointer is empty after the data is read out, the node pointed by the FIRST pointer is taken out from the outer-layer circular queue and inserted after the node pointed by the LAST pointer of the outer-layer circular queue.

In the above example, the data reading is completed after block s403. When it is determined that the inner-layer circular queue is empty at block s404, the node is further taken out from the outer-layer circular queue and inserted after the node pointed by the LAST pointer of the outer-layer circular queue. The node pointed by the FIRST pointer is deleted in time to avoid space wastes.

As shown FIG. 5-FIG. 17, data access of the double-layer circular queue is described below with level traverse of tree as an example. It is assumed that depth and node number of the tree are unknown before traverse. For convenience of descriptions, the capacity of each inner-layer circular queue is set as 2, that is, two elements may be stored and one element is reserved as a sentinel, and the tree nodes are represented by the tree node IDs (0-11).

Figure 5:
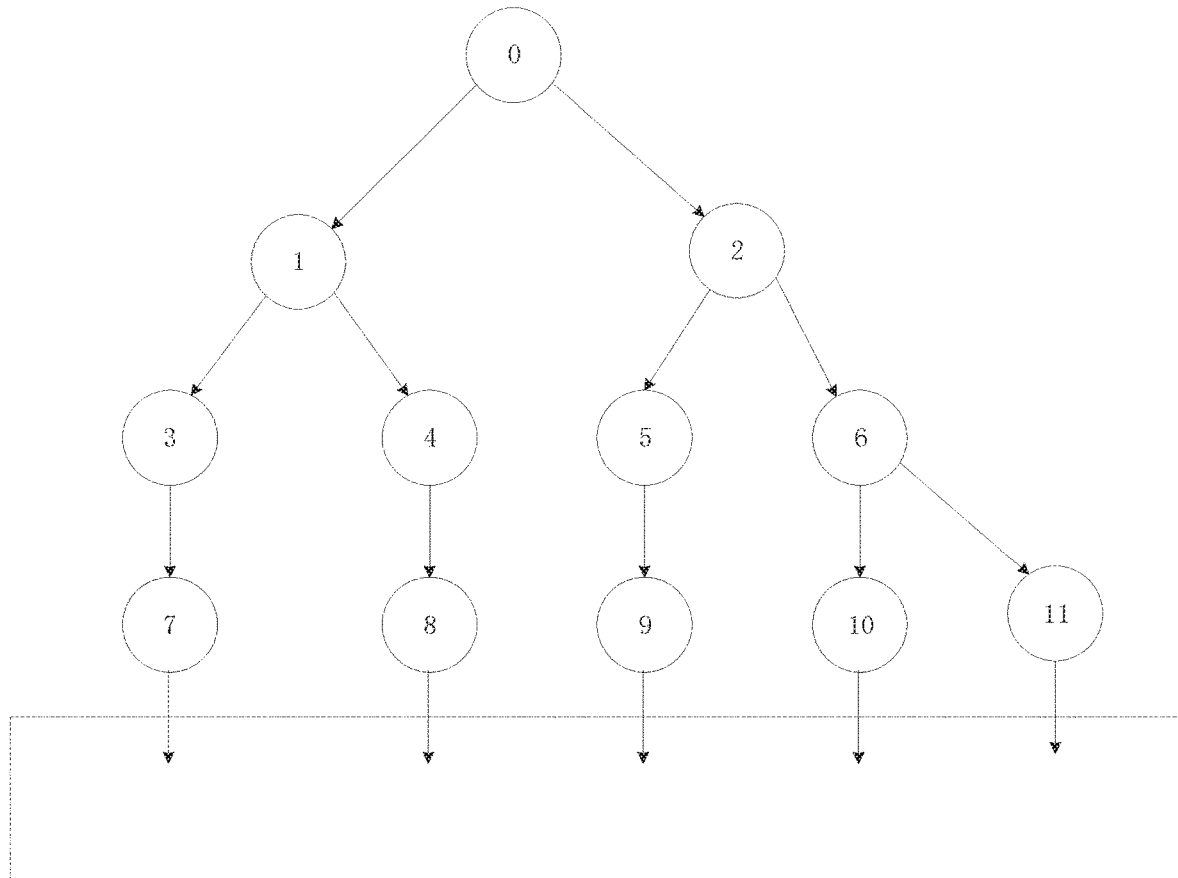
FIG. 5-FIG. 17 are schematic structural diagrams illustrating a data access application of a double-layer circular queue according to an example of the present disclosure.
Figure 6:
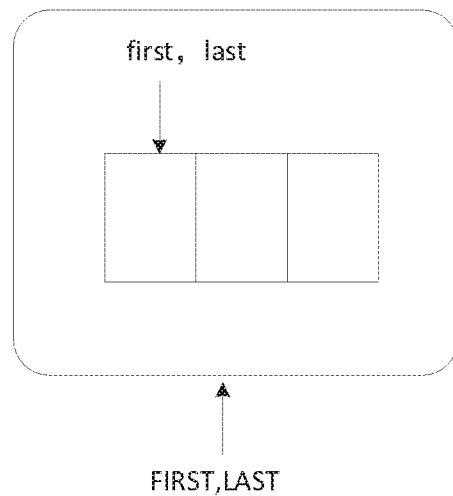

FIG. 5 is a schematic structural diagram of a tree. The tree is traversed by use of a double-layer circular queue based on level in the following process:

(1) A double-layer circular queue is initialized, as shown in FIG. 6.

Figure 7:
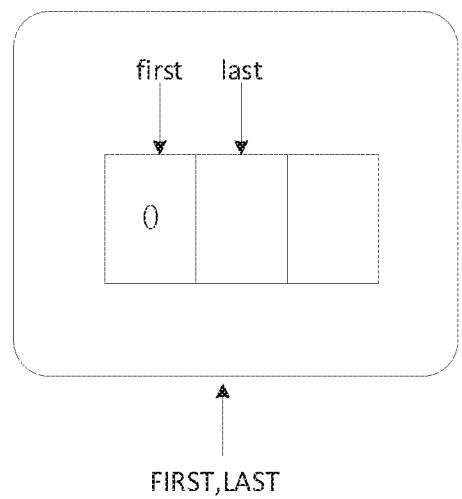

(2) A root node (ID=0) is placed in a queue, as shown in FIG. 7.

Figure 8:
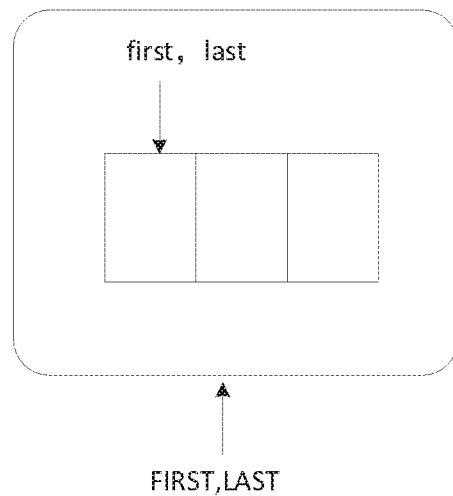

(3) The root node is taken out from the queue, as shown in FIG. 8.

Figure 9:
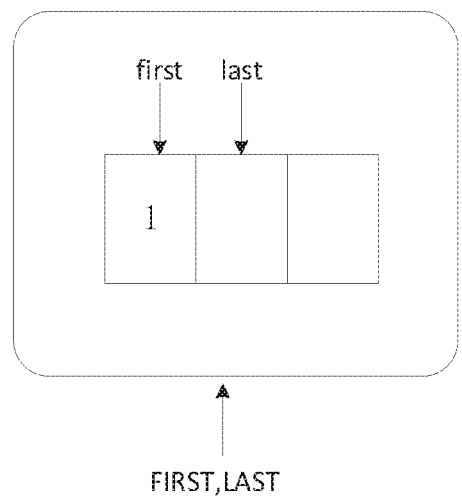

(4) A node 1 is placed in the queue, as shown in FIG. 9.

Figure 10:
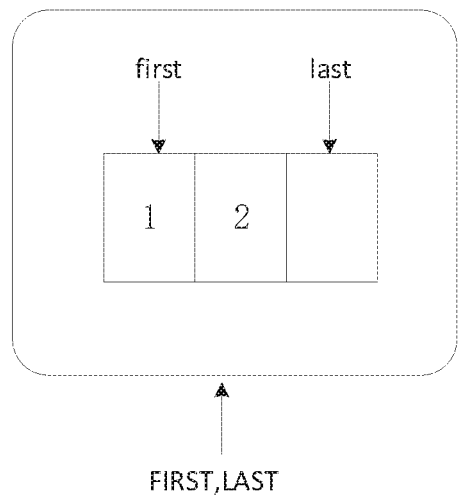

(5) A node 2 is placed in the queue, as shown in FIG. 10.

Figure 11:
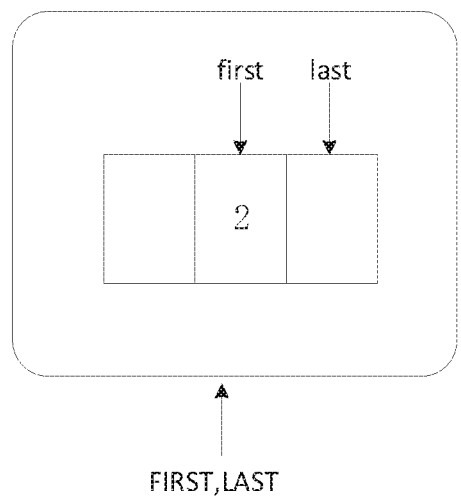

(6) The node 1 is taken out from the queue, as shown in FIG. 11.

Figure 12:
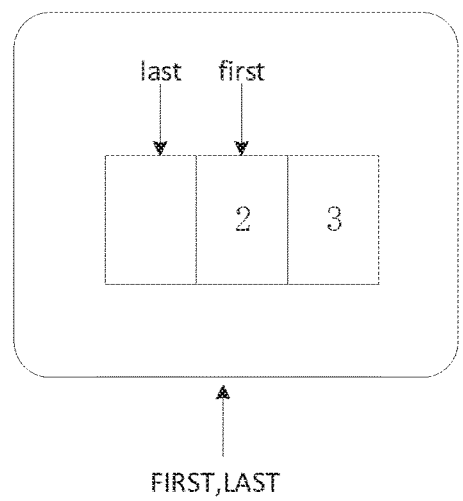

(7) A node 3 is placed into the queue, as shown in FIG. 12.

Figure 13:
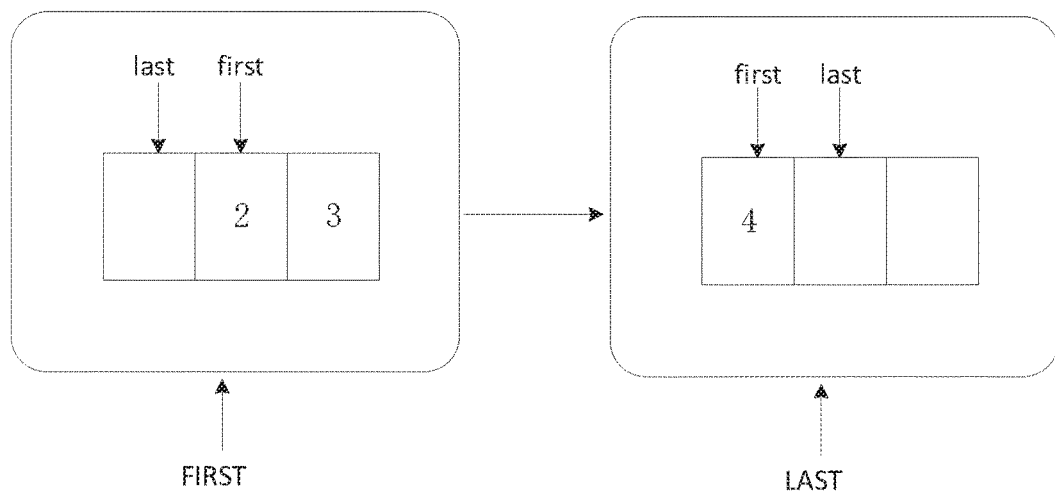

(8) A node 4 is placed in the queue, as shown in FIG. 13.

Figure 14:
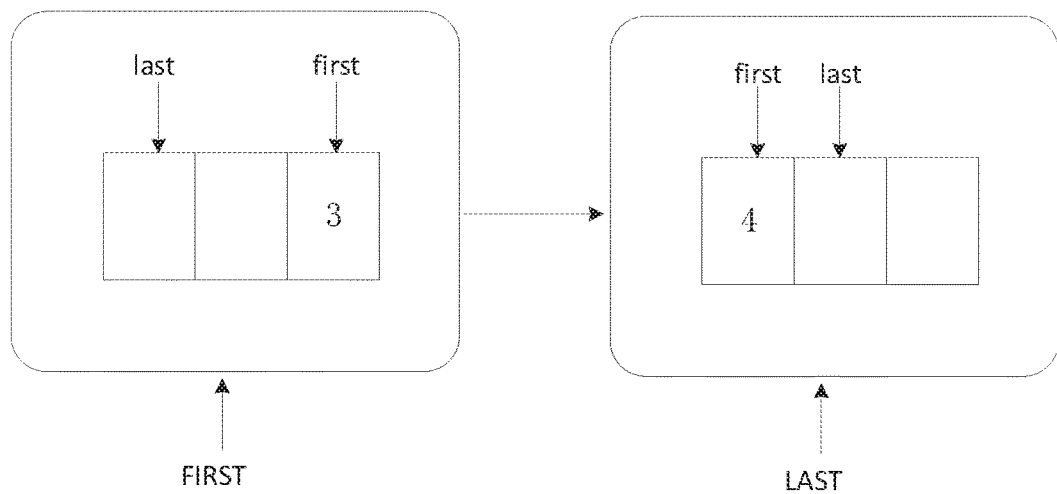

(9) The node 2 is taken out from the queue, as shown in FIG. 14.

Figure 15:
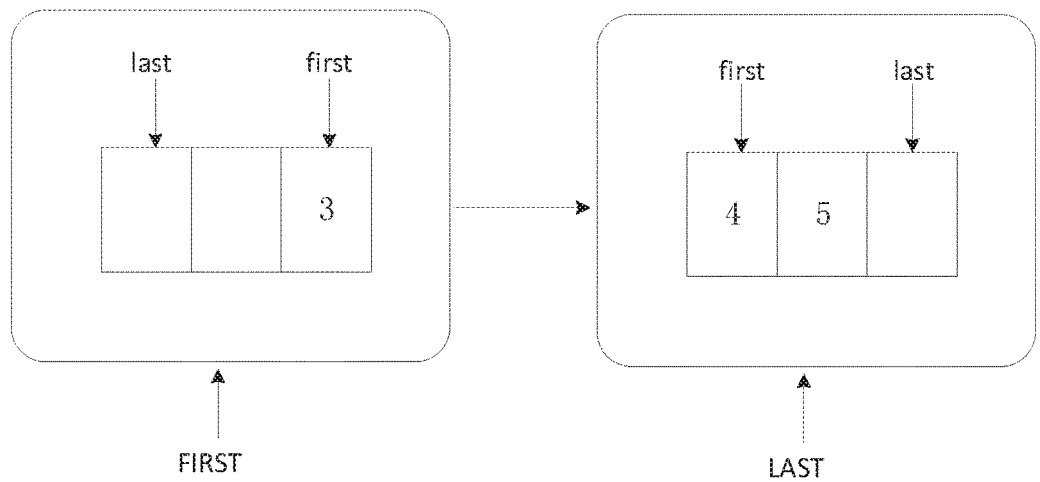

(10) A node 5 is placed into the queue, as shown in FIG. 15.

Figure 16:
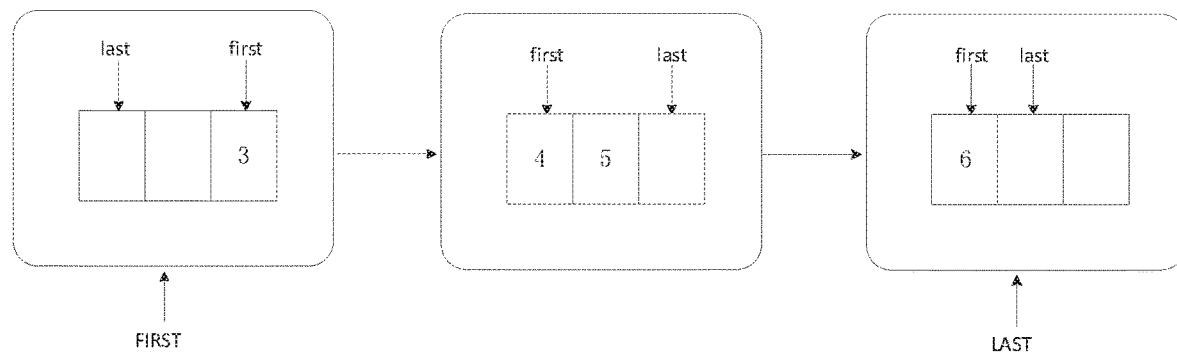

(11) A node 6 is placed into the queue, as shown in FIG. 16.

Figure 17:
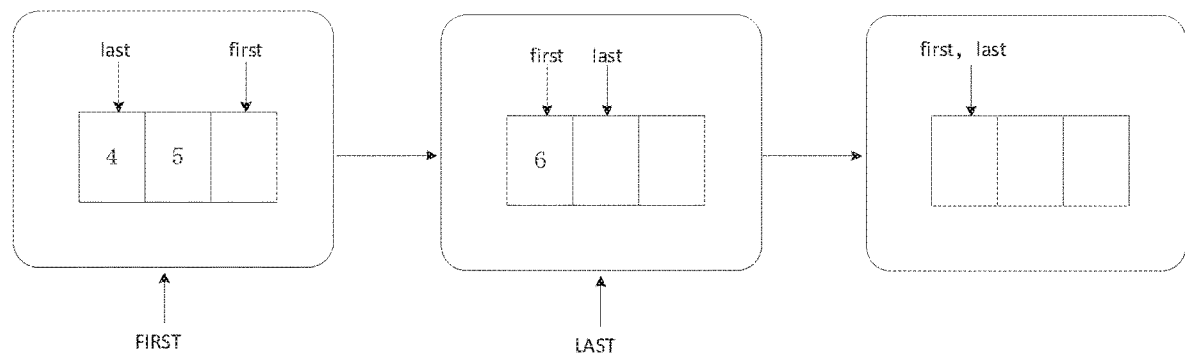

(12) The node 3 is out of queue, as shown in FIG. 17.

It can be seen from the above changes that there is already no element in the inner-layer circular queue pointed by the FIRST pointer after the node 3 is out of queue. At this time, the inner-layer circular queue pointed by the FIRST pointer is taken out from the outer-layer circular queue, and then placed after the node pointed by the LAST pointer of the outer-layer circular queue. The queue after the node 3 is out of queue is as shown in FIG. 17.

The subsequent tree nodes are also traversed in a similar process, which will not be repeated one by one.

Further, if the double-layer circular queue occupies a large memory space, part of the occupied memory space may be released by releasing the space of nodes after the node pointed by the LAST pointer of the outer-layer circular queue. Obviously, such a method is impossible for the queue based on an array.

For a circular queue based on an array, it is usually required to know the maximum amount of data to be stored in advance. In most cases, however, the maximum amount of data to be stored is unpredicted. In this case, the data to be stored may generally be pre-allocated with a capacity. When the data to be stored exceeds the pre-allocated capacity, a larger memory space is newly allocated, and then, the data having already been stored is copied to the newly-allocated memory. If the pre-allocated or newly-allocated memory space is too large, there is much memory space wasted. If the pre-allocated or newly-allocated memory space is too small, a large number of copy operations are necessary, which affects the efficiency of the apparatus.

For a circular queue based on a linked list, each node in the linked list is established dynamically. Thus, every time a piece of data is inserted, a node is established and then inserted into the queue. The linked list implementation requires a pointer, and therefore, a large quantity of space is wasted. In particular, when a large number of elements are stored in the queue, the linked list implementation may cause a large number of memory fragments.

This solution of the examples of the present disclosure adopts a double-layer circular queue having the advantages of the queue based on an array and a queue based on a linked list. In this way, a high access performance may be obtained in a case of a high memory utilization rate. In addition, the size of the inner-layer circular queue may be adjusted based on actual services, which easily achieves an optimal access performance and an optimal memory utilization rate, or the balance of them both.

Corresponding to the examples of the above method, the present disclosure further provides an example of a queue data access apparatus and a terminal to which the apparatus is applied.

Figure 18:
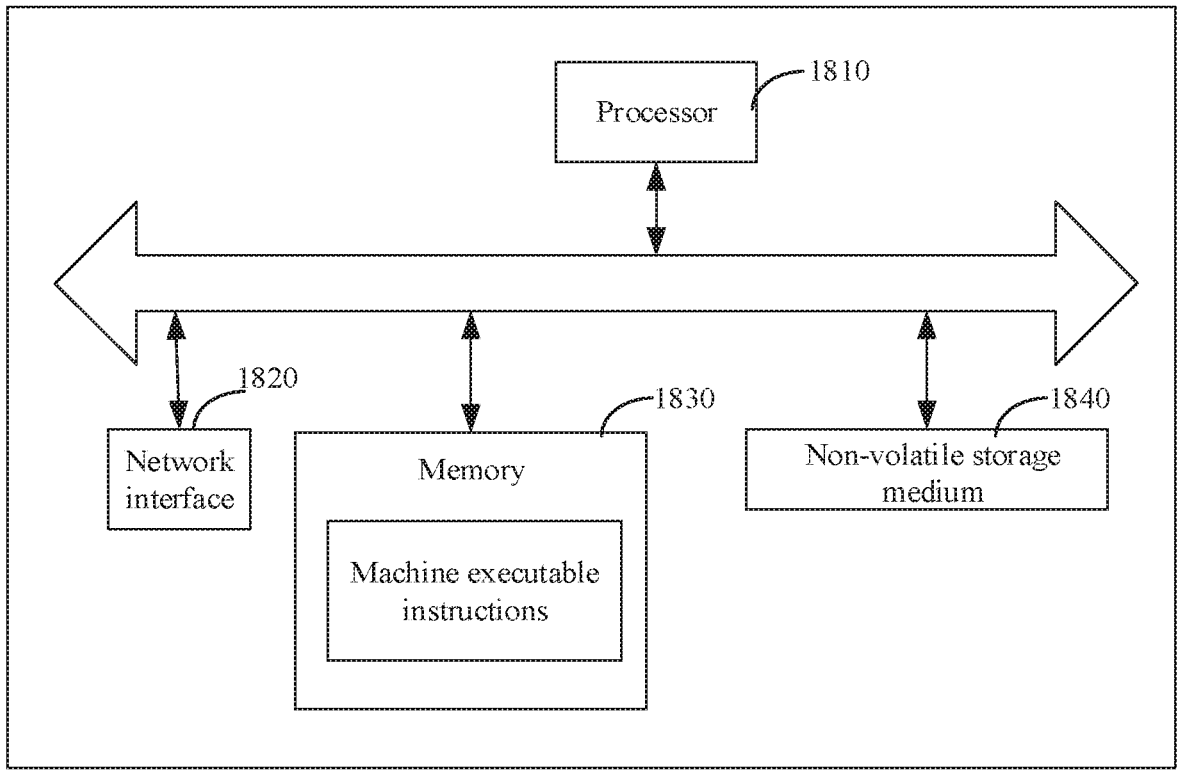
FIG. 18 is a schematic diagram illustrating a hardware structure of an apparatus for accessing queue data according to an example of the present disclosure.

The example of the queue data access apparatus according to the present disclosure may be applied to a computer device, for example, a server or a terminal device. The apparatus example may be implemented by software or by a combination of software and hardware. Taking the implementation of software as an example, the apparatus, as a logical apparatus, is formed by reading corresponding computer program instructions in a non-volatile storage medium into a memory by a processor for queue data access. FIG. 18 is a schematic diagram illustrating a hardware structure of a queue data access apparatus according to an example of the present disclosure. As shown in FIG. 18, on a hardware level, the apparatus includes other hardware based on actual requirements in addition to a processor 1810, a memory 1830, a network interface 1820 and a non-volatile storage medium 1840 shown in FIG. 18, which will not be repeated herein.

Figure 19:
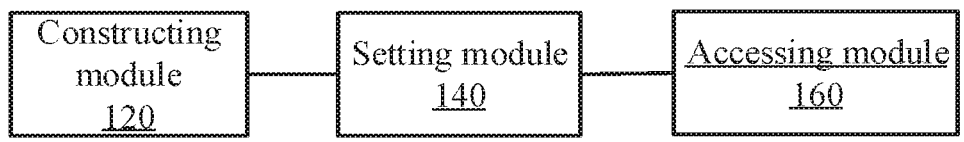
FIG. 19 is a block diagram illustrating an apparatus for accessing queue data according to an example of the present disclosure.

FIG. 19 is a block diagram illustrating a queue data access apparatus according to an example of the present disclosure. The apparatus includes:

a constructing module 120, configured to construct a double-layer circular queue, where the double-layer circular queue includes one or more inner-layer circular queues established in an array manner, and the one or more inner-layer circular queues constitute an outer-layer circular queue of the double-layer circular queue in a linked list manner;

a setting module 140, configured to set a management pointer of the outer-layer circular queue; and an accessing module 160, configured to perform data accessing on the inner-layer circular queues based on the management pointer.

Correspondingly, the present disclosure further provides a queue data access apparatus. The apparatus includes a processor, and a memory for storing instructions executable by the processor. By executing the instructions, the processor is caused to perform the blocks of the above data access method.

In an example, the present disclosure provides a queue data access apparatus. The apparatus includes:

a processor; and a non-volatile storage medium storing machine-executable instructions, by executing the machine-executable instructions, the processor is caused to:

construct a double-layer circular queue, where the double-layer circular queue includes one or more inner-layer circular queues established in an array manner, and the one or more inner-layer circular queues constitute an outer-layer circular queue of the double-layer circular queue in a linked list manner;

set a management pointer of the outer-layer circular queue; and perform data accessing on the inner-layer circular queues based on the management pointer.

The implementation of each module of the above apparatus and its corresponding functions or effects are described in the corresponding blocks of the above method, which will not be repeated herein.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. It can be understood and carried out by those of ordinary skill in the art without creative work.

The specific examples are described as above. Other examples may also be obtained within the scope of the appended claims. In some cases, the actions or blocks recorded in the claims may be performed in a sequence different from the examples to achieve the desired result. Further, the processes shown in drawings do not necessarily require a particular sequence or a continuous sequence to achieve the desired result. In some examples, a multi-task processing and parallel processing is possible and may also be advantageous.

After considering the specification and practicing the present disclosure, the persons of skill in the prior art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the prior art not disclosed in the present disclosure. The specification and examples herein are intended to be illustrative only and the real scope and spirit of the present disclosure are indicated by the claims of the present disclosure.

It is to be understood that the present disclosure is not limited to the precise structures described above and shown in the accompanying drawings and may be modified or changed without departing from the scope of the present disclosure. The scope of protection of the present disclosure is limited only by the appended claims.

The foregoing disclosure is merely illustrative of preferred examples of the present disclosure but not intended to limit the present disclosure, and any modifications, equivalent substitutions, adaptations thereof made within the spirit and principles of the disclosure shall be encompassed in the scope of protection of the present disclosure.

What is claimed is:

1. A method of accessing queue data, comprising:
constructing a double-layer circular queue, wherein the double-layer circular queue comprises one or more inner-layer circular queues established in an array manner, and the one or more inner-layer circular queues constitute an outer-layer circular queue of the double-layer circular queue in a linked list manner;
setting a management pointer for the outer-layer circular queue; and
performing data accessing on the inner-layer circular queues based on the management pointer,
wherein said setting the management pointer for the outer-layer circular queue comprises:
setting a FIRST pointer and a LAST pointer for the outer-layer circular queue, wherein the FIRST pointer points to a first node of the outer-layer circular queue and the inner-layer circular queue corresponding to the first node is non-empty; the LAST pointer points to a last node of the outer-layer circular queue and the inner-layer circular queue corresponding to the last node is non-empty;

said performing data accessing on the inner-layer circular queues based on the management pointer comprises: storing data in a memory block corresponding to the inner-layer circular queue based on a space state of the inner-layer circular queue of a node pointed by the management pointer, wherein said storing data in the memory block corresponding to the inner-layer circular queue based on the space state of the inner-layer circular queue of the node pointed by the management pointer comprises:

determining whether there is an idle memory space in the inner-layer circular queue corresponding to the node pointed by the LAST pointer of the outer-layer circular queue;

determining whether there is a node after the node pointed by the LAST pointer of the outer-layer circular queue when there is no idle memory space;

when determining that there is a node,
pointing the LAST pointer of the outer-layer circular queue to the node after the node pointed by the LAST pointer;

when determining that there is no node,
establishing an inner-layer circular queue as a new node and adding the new node into the outer-layer circular queue, and pointing the LAST pointer of the outer-layer circular queue to the new node; and
storing data into the inner-layer circular queue corresponding to the node pointed by the LAST pointer of the outer-layer circular queue.

2. The method according to claim 1, wherein said constructing a double-layer circular queue comprises:
establishing one or more inner-layer circular queues in an array manner, and allocating a memory block with a continuous address space to each inner-layer circular queue, wherein the memory block is allocated in a page alignment manner and has a preset size;
obtaining an outer-layer circular queue by series-connecting each inner-layer circular queue as a node in a linked list manner.

3. The method according to claim 1, wherein said performing data accessing on the inner-layer circular queues based on the management pointer further comprises:
reading data from the memory block corresponding to the inner-layer circular queue based on the space state of the inner-layer circular queue of the node pointed by the management pointer.

4. The method according to claim 1, wherein said storing data in a memory block corresponding to the inner-layer circular queue based on a space state of the inner-layer circular queue of a node pointed by the management pointer further comprises:
storing data in the inner-layer circular queue when there is the idle memory space.

5. The method according to claim 3, wherein said reading data from the memory block corresponding to the inner-layer circular queue based on the space state of the inner-layer circular queue of the node pointed by the management pointer comprises:
determining whether the inner-layer circular queue corresponding to the node pointed by the FIRST pointer of the outer-layer circular queue is empty;

determining that the double-layer circular queue is empty when the inner-layer circular queue is empty;
reading data out from the inner-layer circular queue corresponding to the node pointed by the FIRST pointer of the outer-layer circular queue when the inner-layer circular queue is non-empty.

6. The method according to claim 5, wherein, the method further comprising:
if the inner-layer circular queue corresponding to the node pointed by the FIRST pointer is empty after the data is taken out,
taking out the node pointed by the FIRST pointer from the outer-layer circular queue and inserting the node pointed by the FIRST pointer after the node pointed by the LAST pointer of the outer-layer circular queue.

7. An apparatus for accessing queue data, comprising:
a processor; and
a non-transitory storage medium storing machine-executable instructions, wherein by reading and executing the machine executable instructions, the processor is caused to:
construct a double-layer circular queue, wherein the double-layer circular queue comprises one or more inner-layer circular queues established in an array manner, and the one or more inner-layer circular queues constitute an outer-layer circular queue of the double-layer circular queue in a linked list manner;
set a management pointer for the outer-layer circular queue; and
perform data accessing on the inner-layer circular queues based on the management pointer,
wherein when the management pointer for the outer-layer circular queue is set, the processor is further caused by the machine executable instructions to:
set a FIRST pointer and a LAST pointer for the outer-layer circular queue, wherein the FIRST pointer points to a first node of the outer-layer circular queue and the inner-layer circular queue corresponding to the first node is non-empty; the LAST pointer points to a last node of the outer-layer circular queue and the inner-layer circular queue corresponding to the last node is non-empty;
when data accessing is performed on the inner-layer circular queues based on the management pointer, the processor is further caused by the machine executable instructions to: store data in a memory block corresponding to the inner-layer circular queue based on a space state of the inner-layer circular queue of a node pointed by the management pointer,
wherein when data is stored in the memory block corresponding to the inner-layer circular queue based on the space state of the inner-layer circular queue of the node pointed by the management pointer, the processor is further caused by the machine executable instructions to:
determine whether there is an idle memory space in the inner-layer circular queue corresponding to the node pointed by the LAST pointer of the outer-layer circular queue;
determine whether there is a node after the node pointed by the LAST pointer of the outer-layer circular queue when there is no idle memory space;
when determining that there is a node,
point the LAST pointer of the outer-layer circular queue to the node after the node pointed by the LAST pointer;
when determining that there is no node, establish an inner-layer circular queue as a new node and add the new node into the outer-layer circular queue, and point the LAST pointer of the outer-layer circular queue to the new node; and store data into the inner-layer circular queue corresponding to the node pointed by the LAST pointer of the outer-layer circular queue.

8. The apparatus according to claim 7, wherein when the double-layer circular queue is constructed, the processor is further caused by the machine executable instructions to:

establish one or more inner-layer circular queues in an array manner, and allocate a memory block with a continuous address space to each inner-layer circular queue, wherein the memory block is allocated in a page alignment manner and has a preset size;

obtain an outer-layer circular queue by series-connecting each inner-layer circular queue as a node in a linked list manner.

9. The apparatus according to claim 7, wherein when data accessing is performed on the inner-layer circular queues based on the management pointer, the processor is further caused by the machine executable instructions to:

read data from the memory block corresponding to the inner-layer circular queue based on the space state of the inner-layer circular queue of the node pointed by the management pointer.

10. The apparatus according to claim 7, wherein when data is stored in a memory block corresponding to the inner-layer circular queue based on a space state of the inner-layer circular queue of a node pointed by the management pointer, the processor is further caused by the machine executable instructions to:

store data in the inner-layer circular queue when there is the idle memory space.

11. The apparatus according to claim 9, wherein when data is read from the memory block corresponding to the inner-layer circular queue based on the space state of the inner-layer circular queue of the node pointed by the management pointer, the processor is further caused by the machine executable instructions to:

determine whether the inner-layer circular queue corresponding to the node pointed by the FIRST pointer of the outer-layer circular queue is empty;

determine that the double-layer circular queue is empty when the inner-layer circular queue is empty;

read data out from the inner-layer circular queue corresponding to the node pointed by the FIRST pointer of the outer-layer circular queue when the inner-layer circular queue is non-empty.

12. The apparatus according to claim 11, wherein the processor is further caused by the machine executable instructions to:

if the inner-layer circular queue corresponding to the node pointed by the FIRST pointer is empty after the data is taken out, take out the node pointed by the FIRST pointer from the outer-layer circular queue and insert the node pointed by the FIRST pointer after the node pointed by the LAST pointer of the outer-layer circular queue.

* * * * *